US011093235B2

(12) United States Patent
Linn et al.

(10) Patent No.: US 11,093,235 B2
(45) Date of Patent: Aug. 17, 2021

(54) SYSTEM AND METHOD FOR REPLACING A LIVE CONTROL/ESTIMATION APPLICATION WITH A STAGED APPLICATION

(71) Applicant: SHELL OIL COMPANY, Houston, TX (US)

(72) Inventors: Richard Eugene Linn, Sugar Land, TX (US); John Martin Williamson, Houston, TX (US); Jean Valiquette, Houston, TX (US); Adam Lee Jordan, Seabrook, TX (US)

(73) Assignee: SHELL OIL COMPANY, Houston, TX (US)

( * ) Notice: Subject to any disclaimer, the term of this patent is extended or adjusted under 35 U.S.C. 154(b) by 502 days.

(21) Appl. No.: 15/578,096

(22) PCT Filed: Jun. 2, 2016

(86) PCT No.: PCT/US2016/035460
§ 371 (c)(1),
(2) Date: Nov. 29, 2017

(87) PCT Pub. No.: WO2016/196757
PCT Pub. Date: Dec. 8, 2016

(65) Prior Publication Data
US 2018/0150292 A1 May 31, 2018

Related U.S. Application Data

(60) Provisional application No. 62/171,564, filed on Jun. 5, 2015.

(51) Int. Cl.
*G06F 8/656* (2018.01)
*G06F 8/71* (2018.01)
(Continued)

(52) U.S. Cl.
CPC ............... *G06F 8/656* (2018.02); *G06F 8/71* (2013.01); *G06F 9/44536* (2013.01); *G05B 2219/36133* (2013.01); *G06F 9/461* (2013.01)

(58) Field of Classification Search
CPC ........ G06F 8/656; G06F 8/71; G06F 9/44536; G06F 9/461; G06F 30/00; G06F 17/50; G05B 2219/36133
(Continued)

(56) References Cited

U.S. PATENT DOCUMENTS 7,107,329 B1 * 9/2006 Schroder ............. H04L 41/0213
709/221
9,047,165 B1 6/2015 Mosterman
(Continued)

FOREIGN PATENT DOCUMENTS

CN 102567006 A 7/2012
CN 102567062 A 7/2012
(Continued)

OTHER PUBLICATIONS

Feng, N. et al. "Dynamic Evolution of Network Management Software by Software Hot-Swapping", 2001, IEEE. (Year: 2001).*
(Continued)

*Primary Examiner* — Cedric Johnson
(74) *Attorney, Agent, or Firm* — Shell Oil Company

(57) ABSTRACT

A staged application may be transitioned, or hot swapped, to live application, that is, the staged version of an application is transited to the live version of an application. The staged version may nm in estimation mode alongside the live version. Only one version of an application may be active in a given run time workspace. The staged version may be initialized with one or more parameters or variables. The staged version may be tested or simulations may be performed to ensure the staged version is ready to be transi-
(Continued)

tioned to a live version. The staged version may execute at a lower priority to ensure that the efficiency and operations of the live version are not disturbed. Once the staged version has been transitioned, the replaced live version or another version may be transitioned to the staged version. The transitioned staged version and the replaced live version may be archived.

14 Claims, 3 Drawing Sheets

(51) Int. Cl.
   *G06F 9/445* (2018.01)
   *G06F 9/46* (2006.01)
(58) Field of Classification Search
   USPC .................................................. 703/22, 13
   See application file for complete search history.

(56) References Cited

U.S. PATENT DOCUMENTS

| | | |
|---|---|---|
| 2002/0073410 A1 | 6/2002 | Lundback et al. |
| 2003/0001003 A1 | 1/2003 | Rowland |
| 2003/0037326 A1 | 2/2003 | Burkhardt et al. |
| 2003/0066065 A1 | 4/2003 | Larkin |
| 2005/0262495 A1 | 11/2005 | Fung et al. |
| 2006/0001019 A1 | 1/2006 | Sandhu et al. |
| 2006/0190209 A1* | 8/2006 | Odom ................... G16H 40/63 702/127 |
| 2006/0195845 A1 | 8/2006 | Rhine |
| 2007/0162565 A1 | 7/2007 | Hanselmann |
| 2007/0168919 A1 | 7/2007 | Henseler et al. |
| 2010/0037031 A1* | 2/2010 | DeSantis ............. G06F 11/1461 711/162 |
| 2013/0001002 A1 | 1/2013 | Platt et al. |
| 2013/0007723 A1 | 1/2013 | Choudhary et al. |
| 2013/0024435 A1 | 1/2013 | Poirier et al. |
| 2013/0080999 A1 | 3/2013 | Yang et al. |
| 2014/0001018 A1 | 1/2014 | Lee |
| 2014/0189671 A1 | 7/2014 | Dujmovic et al. |

FOREIGN PATENT DOCUMENTS

| | | | |
|---|---|---|---|
| CN | 103473101 A | 12/2013 | |
| JP | 2002342102 A | 11/2002 | |
| JP | 2004240988 A | 8/2004 | |
| JP | 2014212425 A | 11/2014 | |
| WO | 2005114398 A2 | 12/2005 | |
| WO | WO-2005114398 A2 * | 12/2005 | ............... G06F 8/65 |
| WO | 2014067330 A1 | 5/2014 | |

OTHER PUBLICATIONS

Baumann, Andrew et al., "Module Hot-Swapping for Dynamic Update and Reconfiguration in K42", Apr. 2005, Proceedings of Linux.conf.au, IBM. (Year: 2005).*

International Search Report and Written Opinion received for PCT Patent Application No. PCT/US2016/035460, dated Sep. 9, 2016, 10 pages.

* cited by examiner

SYSTEM AND METHOD FOR REPLACING A LIVE CONTROL/ESTIMATION APPLICATION WITH A STAGED APPLICATION

PRIORITY CLAIM

The present application is the National Stage (§ 371) of International Application No. PCT/US2016/035460, filed Jun. 2, 2016, which claims priority from U.S. Patent Application No. 62/171,564, filed Jun. 5, 2015 incorporated herein by reference.

TECHNICAL FIELD

The present disclosure relates generally to a run time environment that includes a staged estimation and/or control application that is running in standby mode alongside the live or active application to permit seamless swapping of the staged application to being the live application. In particular, the present invention relates to hot-swapping the live application by the staged application by permitting the staged application to operate in the background until the hot-swap occurs.

BACKGROUND

The present invention relates to a method and process of configuring an information handling system to utilize a staged application concept to reduce down-time and provide more efficiency in operation of a system that includes a model predictive estimator and/or controller (referred to generally as a 'processor').

In general, the basic components of an application include variables, loops, models, processors, and sequences. Variables are generally the fundamental building blocks of an application. The variables are values for the actual process that is being estimated or controlled. Models are representations of relationships between variables and are generally used for prediction in controllers and estimators. Processors carry out functions of an application. Several types of processors may include an estimator, a controller or any other types of processors known to one of ordinary skill in the art. An estimator typically compares the predictions of the model with process measurements and estimates the value of unmeasured disturbances and updates the predictions of the model. The estimator may also operate on the same model as the controller and perform the estimation step necessary to update the model prediction before the controller moves are calculated. A controller, in general, calculates moves on the manipulated variables to achieve the control objectives. A controller may also solve the static feasibility and optimization problems and coordinates the execution of dynamic sub-systems.

Traditionally, changing a processor design while the processor is live has been a challenging problem. In prior configurations of model predictive controllers, the processors were either 'on' or 'off'. Sharing of predictions across versions of a processor was not possible in that once a new control design was uploaded, predictions associated with the prior processor could not be ported to the new uploaded processor. In prior configurations with restricted memory and central processing unit (CPU) space, a live application would need to be stopped or shutdown to upload a new control design which replaced the stopped live application with a new application. This new application (the staged application) would then be run in standby until sufficient confidence was gained that the new behavior was correct, after which it would be made live or started. Shutting down the live application to upload and verify operability of the new control design was inefficient and costly. According to the control design to be uploaded, the time that an application was stopped could be significant during which no application operations could be performed. Also, it could take a significant period of time for the new application to rebuild predictions from the start of activation as this new application was started with a blank prediction horizon. As a result, the configuration would experience poor performance until sufficient time passed after a new control design was uploaded.

The present invention seeks to remedy the inefficiencies and cost associated with the traditional approach by implementation of a staged application concept.

SUMMARY

In accordance with the present disclosure, a system and method is herein disclosed for implementation of a staged application concept. Processor design versions for one or more applications may be archived both within the design-time and run-time environments. In the run-time environment, one or more new processors may be staged such that the new processors are running in standby mode alongside one or more live processors. The new processors may pull historical data stored by the live controllers to build predictions. This results in the predictions of the new processors in the staged application being much closer to those of the live processors in the live application which permits testing and observation of the staged application along with the staged processors to begin much sooner. While the behavior of the staged application's processors are being tested and observed, the processors of the live application remain live or active and continue to transmit estimation results and/or control one or more processes. Once determination is made that the behavior of the new application (the staged application) is acceptable or meets some predefined standard of quality, a hot-swap is made in which the live application is transitioned and the staged application becomes live. When a staged application is promoted to being a live application, the system is not without a running application because the replaced live controller does not need to be shutdown for a period of time so that a new control design may be uploaded and tested. Further, once the staged application is made live, the performance of this new active application does not degrade as the predictions are based on the predictions of the previous live controller. The present invention results in a more efficient operation of a model predictive estimator or controller when version changes are required as no down-time is experienced and the time period for predictions to be rebuilt is reduced if not eliminated. For new applications that are based on the same process output variables as the previously live or active controllers, the present invention of staged application concept will either significantly reduce or eliminate performance degradation present in previous generation model predictive controllers.

In one embodiment, the current staged version is executed in a standby mode concurrent with execution of the current live version, wherein the execution of the current staged version does not affect operation of the current live version. The request to transition the current staged version to replace the current live version so that the current staged controller becomes a live controller is received. The one or more parameters associated with the current staged version with one or more corresponding parameters associated with the current live version are reconciled. The current live version is deactivated. The curt live version is transitioned and the staged version to the live version is transitioned.

In one embodiment, a request to transition a version of the application to a staged version is received. The current staged version is transitioned and the staged version is initialized. In another embodiment, the staged version is initialized with one or more offset parameters. In another embodiment, the current staged version is archived.

In one embodiment, the staged version is initialized with one or more configuration parameters and individual variables. In another embodiment, the current live version is archived. In another embodiment, the current live version is transitioned to the staged version.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

Figure 1:
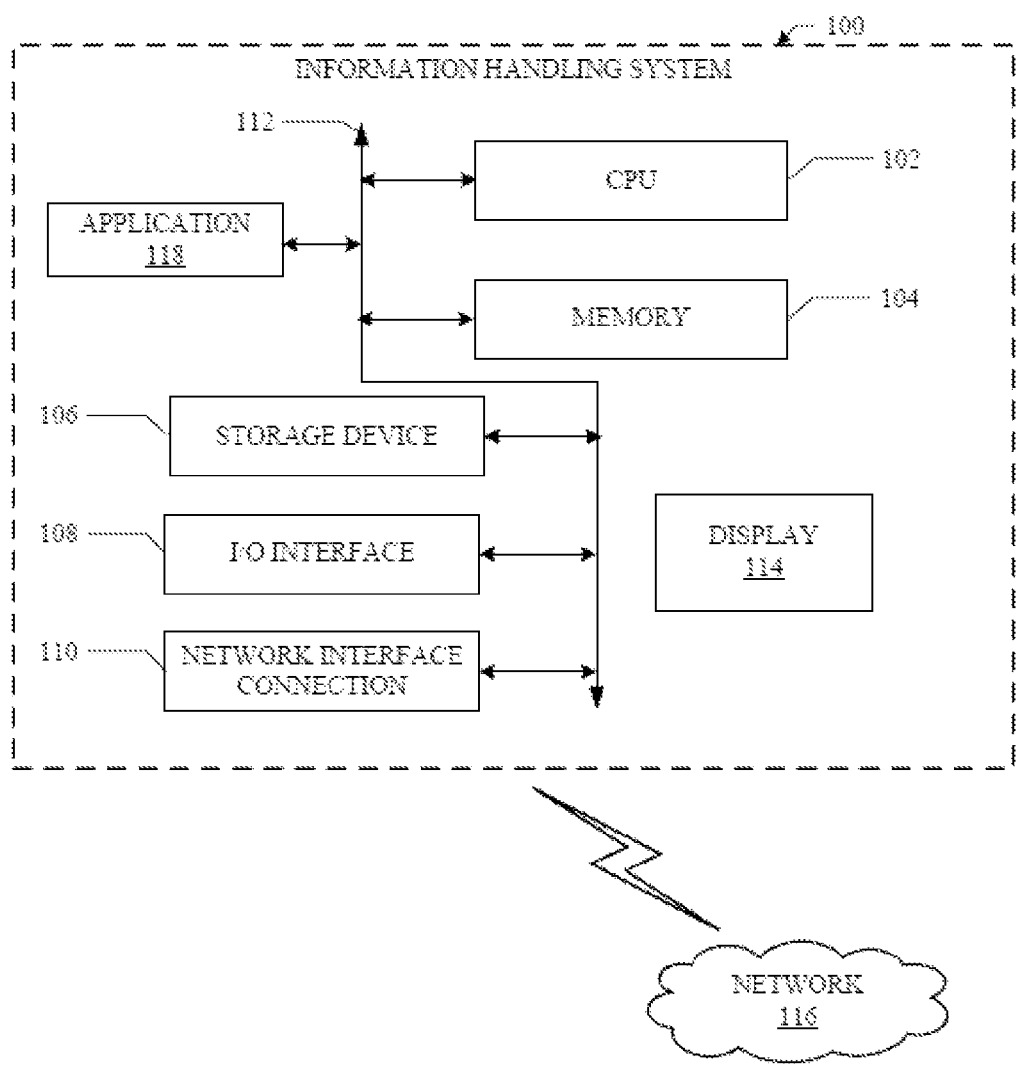
FIG. 1 shows an example information handling system according to one or more embodiments of the present disclosure.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

The method and process of hot-swapping staged and live estimation and/or control applications provides an efficient and inexpensive way to change the model configuration of an estimator or controller. The estimation of process variables and/or control of system, such as a plant, may include implementing systems that use an estimator and/or controller. An estimator refers to a multivariable model-based predictive estimation application designed to estimate the properties of one or more process variables when no measurement is available. A controller refers to a multivariable model-based predictive control (MPC) application designed to perform advanced process control (APC). A processor incorporates many functions, including I/O communications, variable and measurement validation, estimation and prediction, steady-state optimization, and control move calculation. Estimators and controllers are examples of processors. An application may have one or more processors which may be sequenced in execution and have parameters which interface to one another or external to the application.

Referring now to the drawings, the details of specific example embodiments are schematically illustrated. Like elements in the drawings will be represented by like numbers, and similar elements will be represented by like numbers with a different lower case letter suffix.

For one or more embodiments of the present invention, an information handling system may be utilized to implement one or more embodiments. Such embodiments may be implemented on virtually any type of information handling system regardless of the platform being used. Such information handling system hardware used to implement one or more of the embodiments described herein may include a processor configured to execute one or more sequences of instructions, programming stances, or code stored on a non-transitory, computer-readable medium. For example, as shown in FIG. 1, an information handling system 100 includes one or more central processing units (CPU) 102, associated memory 104 (for example, random access memory (RAM), read-only memory (ROM), cache memory, flash memory, etc.), a storage device 106 (for example, a hard disk, solid state memory, an optical drive such as a compact disk drive or digital video disk (DVD) drive, a flash memory stick, etc.), and numerous other elements and functionalities typical of today's computers (not shown). The CPU 102 may function to execute program instructions from one or more modules where the program instructions are stored in a memory device such as memory 104 or storage device 106 or any other memory known to one of ordinary skill in the art. The CPU 102 may be configured to execute an application as contemplated by one or more embodiments of the present invention. The CPU 102 may be a general purpose microprocessor, a microcontroller, a digital signal processor, an application specific integrated circuit (ASIC), a field programmable gate array (FPGA), a programmable logic device, any type of programmable computer controller, a state machine, a gated logic, discrete hardware components, an artificial neural network, or any like suitable hardware known to one of ordinary skill in the art that can perform calculations of other manipulations of data according to the present invention. The information handling system 100 may also include an I/O interface 108 for sending and/or receiving inputs, such as inputs from a keyboard, a mouse, or a microphone. I/O interface 108 may also receive information such as user inputs, multi-dimensional (for example, 3D) geophysical data, one or more values associated with one or more readings, settings, results, variables, feedback (or any other type of data known to one of ordinary skill in the art) from any one or more processes, systems, or external components or any other information known to one of ordinary skill in the art used in systems for model predictive control. For example, in certain embodiments, I/O interface 108 may receive a quality control, level, pressure, temperature or any other reading known to one of ordinary skill in the art from a component within the environment. Further, the information handling system 100 may include output means, such as a display 114 (for example, a liquid crystal display (LCD), a plasma display, or cathode ray tube (CRT) monitor). Display 114 comprises the necessary elements to display any type of data necessary for any of the one or more embodiments of the present invention. For example, display 114 in combination with I/O interface 108 may provide a human to machine interface (HMI) for use in one or more embodiments of the present disclosure.

The information handling system 100 may be connected to a network 116 (for example, a local area network (LAN), a wide area network (WAN) such as the Internet, or any other similar type of network) via a network interface connection 110 to receive data from sensors, measurements, readings or any other data known to one of ordinary skill in the art as required by any one or more embodiments of the present invention. Those skilled in the art will appreciate that many different types of information handling systems exist, and the aforementioned input and output means may take other forms. Generally speaking, the information handling system 100 includes at least the minimal processing, input, and/or output devices, whether hardware, software or any combination thereof, necessary to practice embodiments of the invention.

The CPU 102 of information handling system 100 may also execute one or more applications 118. Application 118 may include one or more processors (not shown) where processor refers to a multivariable model-based predictive estimator or controller (MPC) designed to perform property estimation or advanced process control (APC). A CPU, such as CPU 102, may execute instructions for many functions, including I/O communications, variable and measurement validation, estimation and prediction, steady-state optimization, and control move calculation associated with application 118. Application 118 may contain its own estimation function, but has configuration parameters available for interface and collaboration with other processing units including CPU 102.

Any one or more processors associated with application 118 may also be associated with a model and version, which itself may contain a list of input and output variables, and may also include sub-systems, variable sets, economic functions, and tuning and other design and version information. The lists of variables for application 118 and its model must be consistent (for example, when a variable is added or removed from the application 118, it is also automatically added or removed from the model). Variables in a model are classified as either model inputs or as model outputs. This classification is for modeling purposes only (for example, the mathematics of using measured inputs to produce estimates of process values) and does not necessarily structurally correspond to the physical arrangement of the process being modeled. A significant portion of the design process for application 118 involves selection of the input and output variables, and development of the model. Application 118 may be a staged application with a given version or a live application with a given version.

In the specification and in the claims the term 'manipulated variable' (MV) is used to refer to variables that can be manipulated by the application 118, and the term 'controlled variable' (CV) is used to refer to a variable that has to be kept by the advanced process controller at a predetermined value (set point) or within a predetermined range (set range). The term 'disturbance variable' (DV) is used to refer to a variable whose value can change independently of the controller but whose effect is included in the controller model. The term 'intermediate variable' (IV) is used to refer to a variable that is an output of the controller model but which has relationships as an input to other model outputs. The expression "variable sets" is used to refer to a defined group of variables used by a given controller of an application 118. A given controller may have many variable sets and any variable may be a member of a variable set. However, a variable only appears once in a variable set. The expression 'optimizing a variable' is used to refer to maximizing or minimizing the variable and to maintaining the variable at a predetermined value. The term 'best performance" is used to refer to the most vicinity to a user provided value (setpoint/RTO target) or an economically highest profit/lowest cost, whichever is higher priority for given circumstances. The term process output variable (POV) relates to a variable whose value is changed by changes in the process inputs. The term 'best performance value (BPV) is used to refer to the value that would correspond to the best performance within specified CV limits, where the CV limits are the original limits before feasibility recover because relaxation in limits is considered a drop in performance. The BPV values may be computed as a byproduct of the static calculation. The expression 'real-time optimization' is used to refer to an automated process for computing the best economic operating point of a process with given constraints.

Variables in application 118 can be further classified based on their structural relationship to the process. Process inputs can be classified as MVs (independent process settings which will be adjusted by the controller) or as DVs (independent process settings which will not be adjusted by the application, and process measurements which are not affected by changes in the MVs).

Application MVs may be grouped into sub-systems to optimize their processing. The application may contain a coordination layer that manages each individual sub-system and ensures proper collaboration between the sub-systems. Application 118 calculations may include static optimization and dynamic move calculations. Static optimization, in which steady state target values for each CV may be estimated based on current measurements, predicted response, prioritized constraints, and specified (static optimization) economic functions. Dynamic move calculation, in which a current move and a projected move plan for each controller MV is determined based on response tuning and the calculated target values.

Variable Sets provide for grouping CVs for display and for transactional control (for example, changing modes). Economic functions are used to define specific steady-state (or static) optimization objectives for the application, and determine target values for each CV, consistent with both the full set of CVs and the application model. An application's mode is the manner in which a controller of the application is running which includes inactive, standby (staged), and active (live). Special permission settings may be instituted for an operator or user to restrict the access to changing an application's mode.

The operator or user should set the requested mode to live for the application 118 to perform estimation or control. The operator or user may place the application 118 in standby when preparing for live mode, or when a short term intervention in the application's actions is required. However, in the present invention, when application 118 is ran in standby mode it is executing in parallel or concurrently with the execution of a live application (the application that is currently in operation). While in standby (staged) mode, one or more processors of application 118 may calculate predictions and/or moves for its MVs, but will not send them out to be implemented. The operating sets will remain in their current requested mode when the application 118 is placed in standby. The operator or user may place the application 118 in inactive mode if it is desired to inactivate the application for a longer period; while in this mode, the one or more processors of application 118 will not perform any calculations.

A user may be any operator, engineer, one or more information handling systems 100 or any other user known to one of ordinary skill in the art.

Further, those skilled in the art will appreciate that one or more elements of the aforementioned information handling system 100 may be located at a remote location and connected to one or more other elements over a network. Further, embodiments of the invention may be implemented on a distributed system having a plurality of nodes, where each portion of the invention may be located on a different node within the distributed system. For example, the display 114 may be located remotely from the other components of the information handling system 100. Information handling system 100 may comprise one or more client devices, servers, or any combination thereof.

Figure 2:
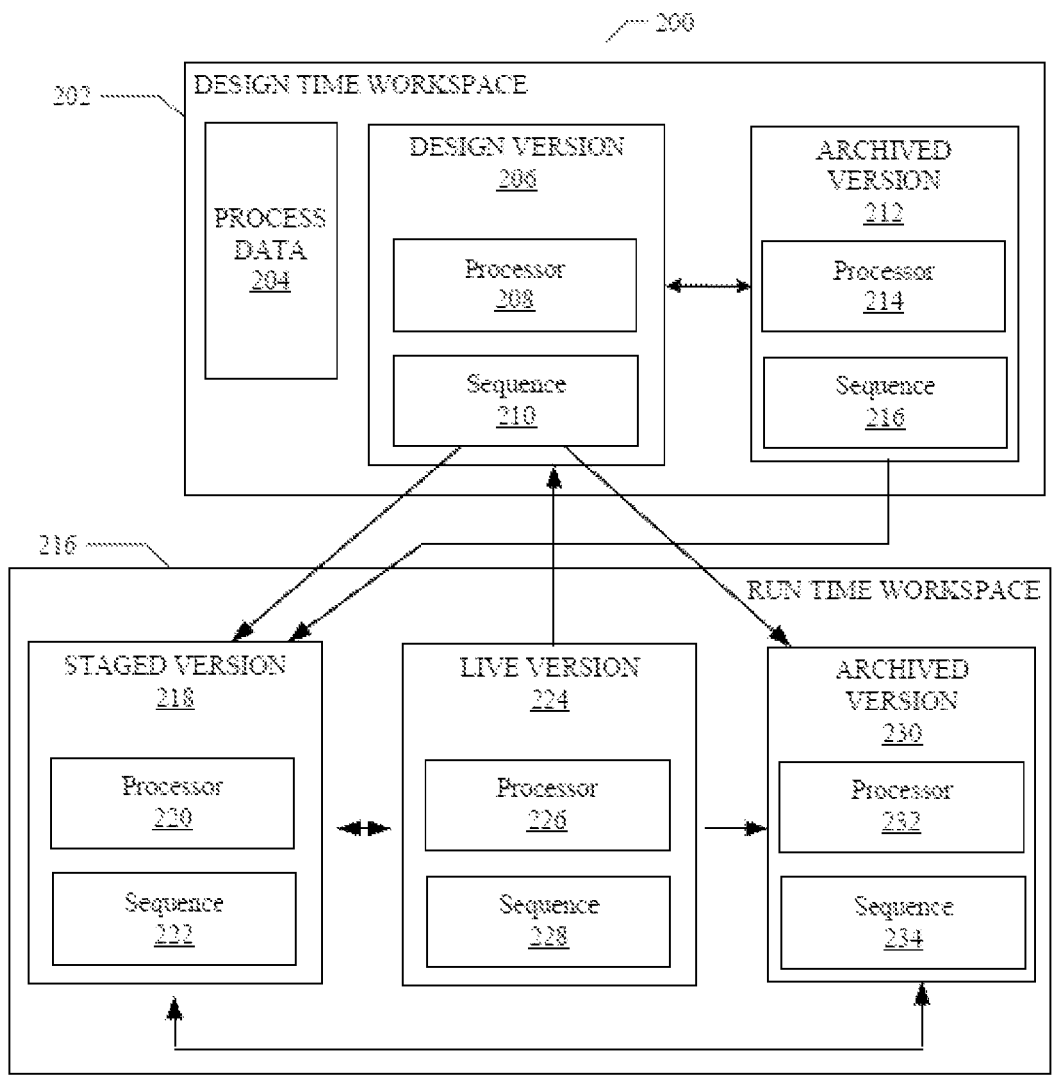
FIG. 2 shows an example workspace according to one or more embodiments of the present disclosure.

Referring to FIG. 2, depicted generally at 200 is a workspace environment for an application 118 of an information handling system 100. In one embodiment, both the design time workspace 202 and the run time workspace 216 for an application reside on the same information handling system 100. In other embodiments, the design time workspace 202 and the run time workspace reside on one or more information handling systems 100. The design time workspace 202 includes design version 206 of application 118 which includes configuration data editable using an interface such as an HMI. The design version 206 includes an associated processor 208 and an associated sequence 210. While only one processor 208 is shown, it is contemplated that one or more processors 208 may be included for performing the required functionality. Processors 208 carry out the functions of the application 118 when executed. Sequence 210 defines which processors 208 to execute, the order in which they execute, and the frequency at which they execute. The design version also defines any link between processors 208 and external data sources (not shown). Only one version of the design configuration 206 exists in the design time workspace 202, however this version may be modified, for example, by a user using a human to machine interface comprising I/O interface 108 and display 114.

The design time workspace 202 may include an archived version 212. Archived version 212 comprises an associated processor 214 and sequence 216 and is not modifiable. Processor 214 and sequence 216 provide the same functionality as described for processor 208 and sequence 210. While only one processor 214 is shown, it is contemplated that one or more processors 214 may be included for performing the required functionality. While only one archived version 212 is shown, any number of archived versions 212 may be included. That is, one or more prior versions of a design version 206 for application 118 may be archived as archived version 212 which each having associated with them a processor 214 and a sequence 216. As indicated, a design version 206 at any time may be archived, moved or copied, as an archived version 212. Likewise, an archived version 212 may revert to a design version 206. Any archived version 212 may be selected to either replace a design version 206 or for selectively parts of the archived version 212 to be merged with the design version 206. For example, in one embodiment, a user is provided with one or more of the archived versions 212 available for design time workspace 202. The user chooses whether to replace the design version 206 with the archived version 212. The user may then be prompted to create an archived version of the design version 206 prior to instituting the requested change.

An application may run in simulation or test mode but cannot be run online from the design time workspace 202.

The run time workspace 216 may include a staged version 218 and a live version 224 of the application 118. The staged version 218 may run with one or more processors 220 in standby mode alongside the live version 224. Run time workspace 216 need not include a staged version 218. A staged version 218 is modifiable at least as to its associated attributes. The staged version 218 and the live version 224 are two different configurations of the same application. Just like the design version 206 above, the staged version 218, live version 224 and archived version 230 may include similar components such as processor 220 and sequence 222, processor 226 and sequence 228, and processor 232 and sequence 234, respectively. While only one processor 220, 226 and 232 is shown, it is contemplated that one or more processors 220, 226 and 232 may be included for performing the required functionality of the associated applications. These similar components have similar functionality to those described above with respect to design version 206. A copy of the staged version 218 and a live version 224 may at any point in time be archived as an archive version 230.

Live version 224 may be replaced by a staged version 218. In that case, live version 224 may be archived as an archived version 230, replace design version 206 in the design time workspace 202 or become the staged version 218. Further, it is contemplated that live version 224 could also be deleted completely from the run time workspace 216.

A design version 206 may also be exported to the run time workspace 216 as a staged version 218. For example, in one embodiment, a design version 206 is exported to a portable format. This portable format may then be moved to either a run time workspace 216 or to another design time workspace 202 permitting collaborative development of an application. In one embodiment a design version 206 is exported to the run time workspace 216 as the staged version 218, the previous staged version 218 is archived as archived version 230. In another embodiment, a design version 206 is imported to the run time workspace 216 as an archived version 230. The staged version 218 may then be archived as one of the archived version 230. The archived version 230 of the imported design version 206 is then transitioned to be the staged version 218.

Likewise a previously archived version 230 may also be transitioned (copied or moved) to a staged version 218. A staged version 218 need not be continuously present in the run time workspace 216. Run time workspace 216 may also not have a single archived version 230 or may have any number of archived versions 230. Archived version 230 is not modifiable. A live version 224 may be transitioned (moved or copied) as an archived version 230 at any time.

In the run time workspace 216, multiple applications, with their own associated live version 224, may be running online, each within its own run time workspace 216. That is, any number of run time workspaces 216 may be running on information handling system 100. Any staged version 218, live version 224, or archived version 230 in run time workspace 216 may be exported from the run time workspace 216 to a portable format where the portable format may then be transitioned (moved) to either a design time workspace 202 (where editing of the version is permitted) or another run time workspace 216.

Figure 3:
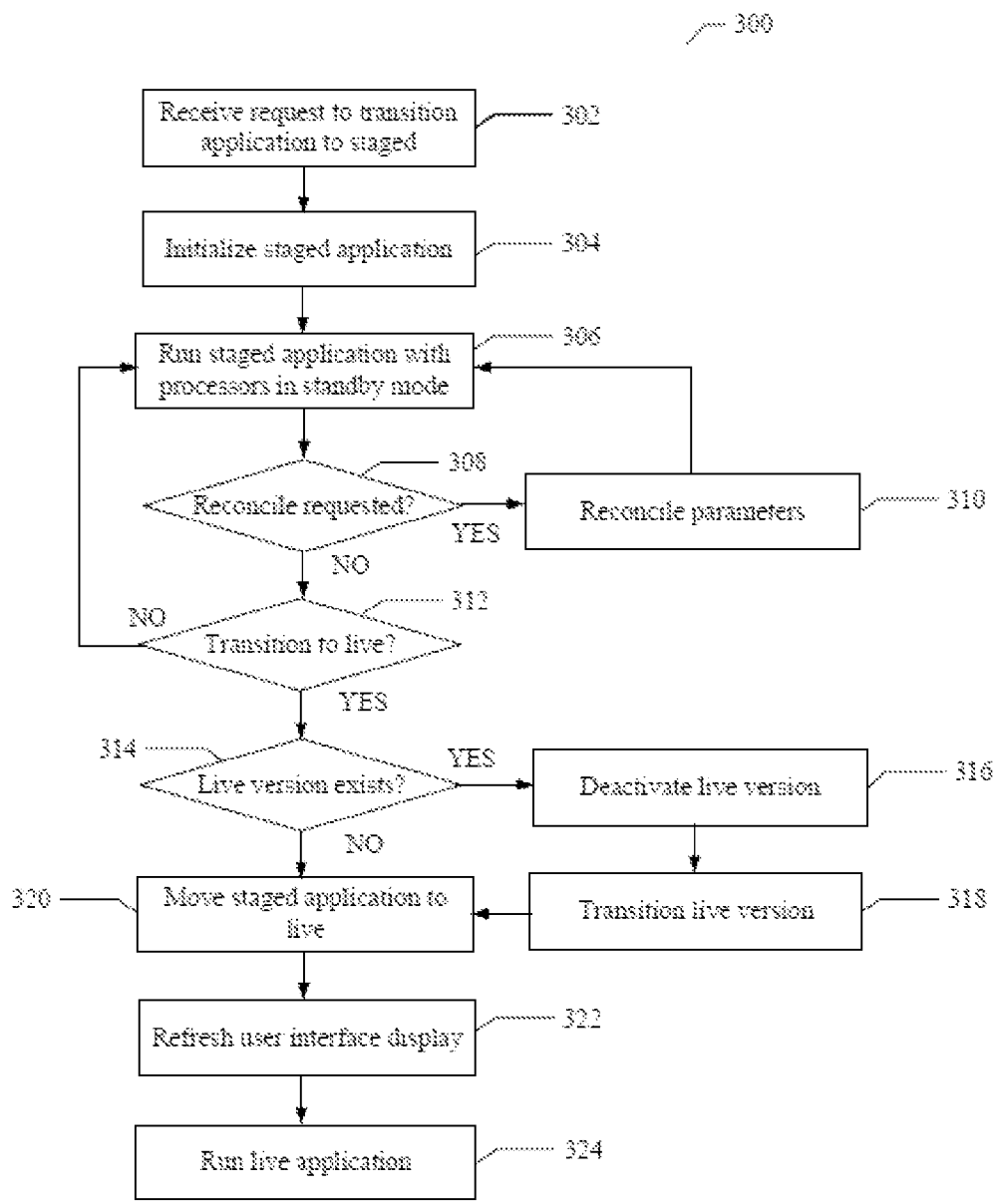
FIG. 3 flow diagram for hot-swapping a staged version of an application with a live version of an application according to one or more embodiments of the present disclosure.

Referring to FIG. 3, depicted generally at 300 is a flow diagram for hot-swapping the staged version 218 and the live version 224 according to one or more embodiments of the present disclosure. At step 302 a request is received to transition a version of an application, such as application 118, to a staged application as a staged version 218. As shown in FIG. 2, an application 118 may be transitioned as a staged version 218 with a configuration from design version 206 or archived version 212 or, archived version 230 or live version 234. The staged version 218 may be run at a lower priority than the live version 224 to ensure the efficiency and proper operation of the live version 224. In one embodiment, a scheduler may display on display 114 the status of the live version 224 and the staged version 218. In another embodiment, only certain users are permitted to see information associated with both the live version 224 and the staged version 218. For example, in one embodiment a user may have permissions set which enable a user may have access to information associated with both the live version 224 and the staged version 218 while another user may only be permitted to view information associated with the live. Any number of users may be granted any combination of permissions according to specific requirements of a given embodiment.

At step 304, the current staged version, if there is one, is replaced (the requested version becomes application becomes the staged version 218). The current staged version (the staged version 218 that is being replaced, if there is one) may be transitioned (archived or moved). The current staged configuration may be archived as an archived version 230 or moved to replace the live version 224. The staged version 218 is initialized. The staged version 218 may be initialized with one or more configuration parameters, such as one or more scheduling parameters. For example, in one embodiment, the staged version 218 is initialized with a starting delay offset parameter that staggers the starting point of the staged version 218. The starting delay offset parameter specifies the time in seconds, or any other appropriate measurement of time, between, for example, an auto-start being initiated and a request to execute for the first time being instituted. In embodiments, where multiple staged versions 218 and/or live versions 224 exist, if the starting delay offset parameters are set too close together, then each staged version 218 or live version 224 will begin execution only when the previous staged version completely starts execution. Also, in one or more embodiments, an execution offset parameter may be utilized to represent the offset in seconds, or any other appropriate measurement of time, between the top of the timeframe (for example, top of the minute) and the time the staged version 218 or live version 224 will execute.

In one or more embodiments, a current staged version 218 does not exist. That is, the run time workspace 216 does not include a staged version 218.

In one or more embodiments, staged version 218 may also be configured with individual variables, MV, DV, CV, POV, or any other configuration parameters known to one of ordinary skill in the art or that are appropriate for the given application 118. Any one or more of these individual variables or configuration parameters may have values based, at least in part, on historical or current values. For example, in one embodiment one or more of these individual variables or configuration parameters may have values based, at least in part, on the current corresponding parameter value currently in use by the live version 224. In another embodiment, the values of one or more of these individual variables or parameters may be based, at least in part, on a historical value of a previous version, such as an archived version 230 or 212 or design version 206 or of the current live version. In another embodiment, the values of one or more of these individual variables or configuration parameters may be based, at least in part, on a predictive or estimation model. In other embodiments, staged version 218 may also be initialized based on one or more parameters, including one or more configuration parameters, set by a user. For example, a user may be an engineer, operator, one or more information handling systems 100, or any combination thereof. In one embodiment an engineer or an operator may set one or more parameters using an HMI.

At step 306, the staged version 218 is run with its processors in standby mode. In standby mode, the processor 220 is being readied for going active. In standby mode values of any parameters or variables may be simulated and calculations are executed without affecting the live version 218. The user may view or receive updates, outputs, and inputs from the staged version 218 if it the processor 220 was in active mode. However, any changes to updates, outputs, inputs, or other data is not sent to any external data source or to any source that would affect or interfere with the operation of the live version 224.

At step 308 it is determined if reconciliation of any one or more parameters (including configuration parameters) or individual variables has been requested. That is, parameters (or individual variables) that exist in both the staged version 218 and the live version 224 may be reconciled. In one or more embodiments a user, at any time, will have the option to reconcile data from the live version 224 and the staged version 218. In one or more embodiments, step 308 may not be performed. If it is determined to reconcile parameters (or individual variables), at step 310 the parameters (or individual variables) are reconciled. During reconciliation, any parameter value (or individual variables) that was changed during executing of the live version 224 will be copied to the staged version 218. While step 310 is shown to occur after step 308, in one or more embodiments, reconciliation may occur at any time and may be initiated at the request of a user. For example, in one embodiment an HMI may present a user with an option to reconcile data. Reconciliation preserves data associated with the live application 224 that, for example, may have been changed or altered by a user.

If reconciliation is not requested, then at step 312 it is determined whether the staged version 218 should be transitioned to be the live version 224. If the staged version 218 should not transition to live, then the process continues at step 306. Generally, the decision to transition a staged version 218 will be transitioned to the live version 224 will be made after testing of staged version 218 has been completed and it is determined that the staged version 218 is ready to go live. Prior to going live, the staged version 218 may be modifiable at any time. For example, variables sets and individual variables may be modified to simulate different scenarios. In one embodiment an HMI which send information to display 114 (at the site of or at a remote location) is utilized to receive input from a user, such as an engineer or an operator, to institute the transition of the staged version 218 to live version 224. For example, in one embodiment a dialog box may be displayed to the user prompting the user with one or more options, including an option to go live.

At step 314 it is determined if the live version 224 of live 118 exists. If a live version 224 does exists, then that live version 224 must be deactivated at step 316. The one or more processors 226 are set to an inactive mode and the live version 224 is no longer operational. That is, all of the processors 226 are in memory, but are not performing any calculations. No outputs or other data is changed. At step 318, the live version associated with the live application 118 is transitioned as discussed with respect to FIG. 2.

If it is determined that no live version 224 exists at step 314 or after the transitioning the live application at step 318, the process continues at step 320 by transitioning or moving the staged version 218 to be the live version 224. The live version 224, in one embodiment, may be moved at step 318 to the staged version 218 at the same time that staged version 218 at step 320 is moved to the live version 224. In one embodiment, the live version 224 is exported or archived according to FIG. 2 as discussed previously. In one embodiment, steps 318 and 320 are performed automatically without any user intervention according to predefined settings. In another embodiment, steps 318 and 320 are performed according to user defined settings at the time of transition.

At step 322, information associated with the transition or any other information is refreshed on display 114. In one embodiment, such information may include information or data related to whether the transition was a success. If the transition was not a success then an error message may be displayed on display 114. For example, a write failure may occur preventing the transition of the staged version 218 to the live version 224. If the transition was a failure then the live version 224 will remain as the live version 224 and step 324 may not be implemented. If the transition was a success, any type of transition results may be displayed.

At step 324, the newly transitioned live version is run. While not shown, in one or more embodiments data associated with any one or more steps of FIG. 3 may be logged. Logged data may be stored in memory 104 or storage device 106 or any other appropriate storage location known to one of ordinary skill in the art. Further, in one or more embodiments, any logged data may also be transmitted to display 114 or any other mechanism for viewing data. In one or more embodiments, any step of FIG. 3 may have data associated with it that may be displayed for any one or more users. In one or more embodiments, user access to any data may be based, at least in part, on one or more permission settings.

While the embodiments are described with references to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fail within the scope of the inventive subject matter.

That which is claimed is:

1. A method for replacing a current live version of an application with a current staged version of the application, the method comprising:
    executing the current staged version in a standby mode concurrent with execution of the current live version, wherein execution of the current staged version does not affect operation of the current live version;
    receiving a request to transition the current staged version to replace the current live version so that a current staged controller becomes a live controller;
    reconciling one or more parameters associated with the current staged version with one or more corresponding parameters associated with the current live version;
    deactivating the current live version;
    transitioning the current live version; and
    transitioning the current staged version to the current live version.

2. The method of claim 1, further comprising:
    receiving a request to transition a version of the application selected from the current live version, a design version, an archived version, a previously archived version or any other version of the application to a staged version;
    transitioning the current staged version; and
    initializing the current staged version.

3. The method of claim 2, wherein the staged version is initialized with one or more offset parameters.

4. The method of claim 2, further comprising:
    archiving the current staged version.

5. The method of claim 2, wherein the staged version is initialized with one or more configuration parameters and individual variables.

6. The method of claim 1, further comprising:
    archiving the current live version.

7. The method of claim 1, further comprising:
    transitioning the current live version to a staged version.

8. A system comprising:
    one or more central processing units for processing information;
        a memory communicatively coupled to the one or more central processing units; and
        one or more modules that comprise instructions stored in the memory, the instructions, when executed by the one or more processing units, operable to perform operations comprising:
    executing a current staged version of an application in a standby mode concurrent with execution of a current live version of the application, wherein execution of the current staged version does not affect operation of the current live version;
    receiving a request to transition the current staged version to replace the current live version so that a current staged version becomes a live version;
    reconciling one or more parameters associated with the current staged version;
    deactivating the current live version;
    transitioning the current live version; and
    transitioning the current staged version to the live version.

9. The system of claim 8, wherein the instructions, when executed by the one or more central processing units, further operable to perform operations comprising:
    receiving a request to transition a version of an application selected from the current live version, a design version, an archived version, a previously archived version or any other version of the application to a staged version of the application;
    transitioning the current staged version; and
    initializing the current staged version.

10. The system of claim 9, wherein the staged version is initialized with one or more scheduling parameters.

11. The system of claim 9, wherein the instructions, when executed by the one or more central processing units, further operable to perform operations comprising:
    archiving the current staged version.

12. The system of claim 9, wherein the staged version is initialized with one or more configuration parameters and individual variables.

13. The system of claim 8, wherein the instructions, when executed by the one or more central processing units, further operable to perform operations comprising:
    archiving the current live version.

14. The system of claim 8, wherein the instructions, when executed by the one or more central processing units, further operable to perform operations comprising:
    transitioning the current live version to a staged version.

* * * * *